United States Patent Office 3,212,851
Patented Oct. 19, 1965

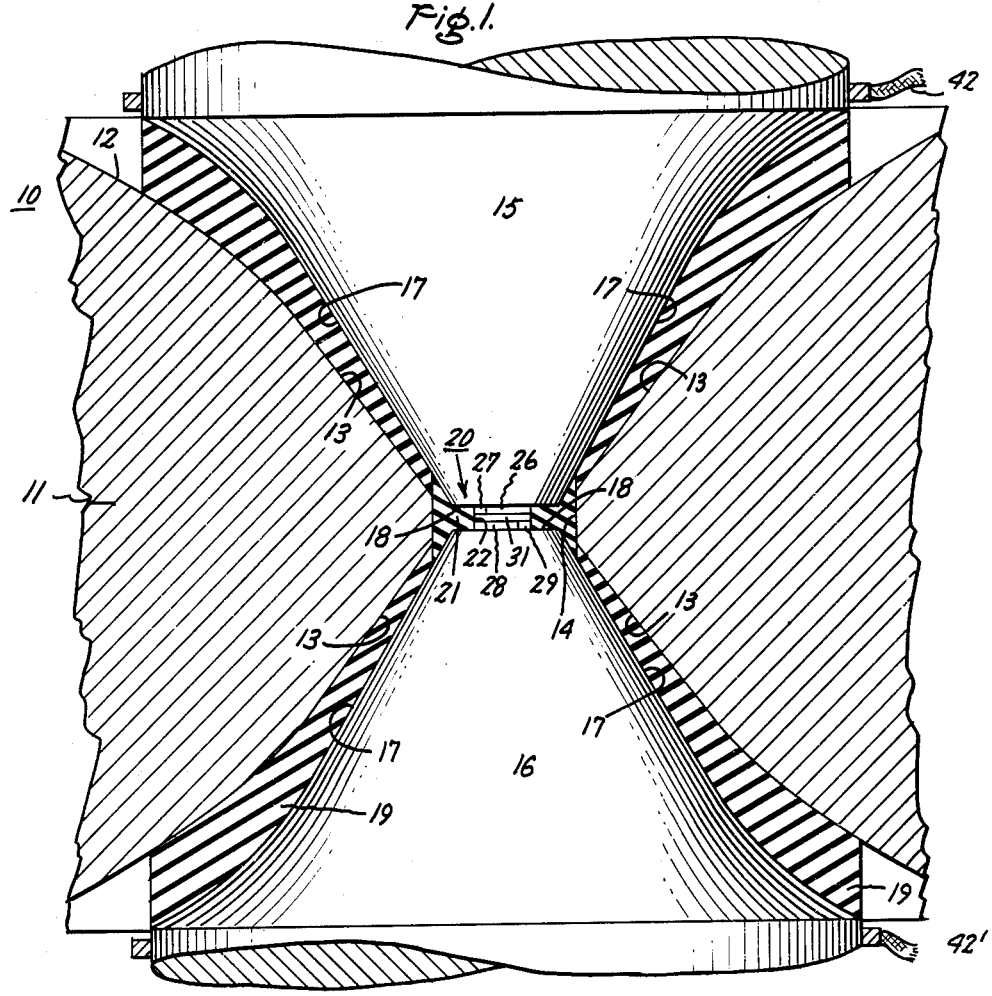
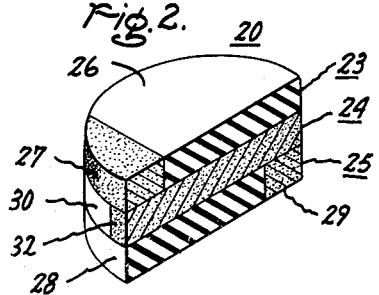
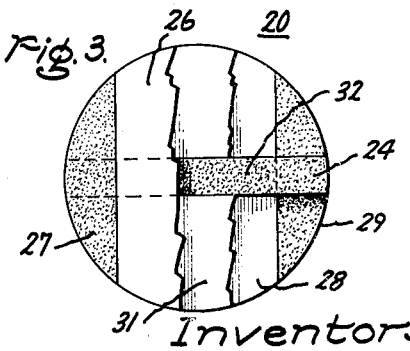

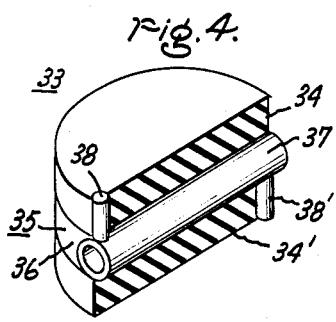
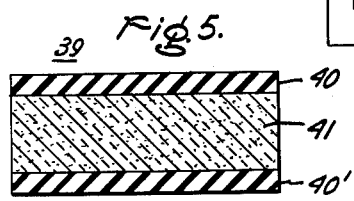
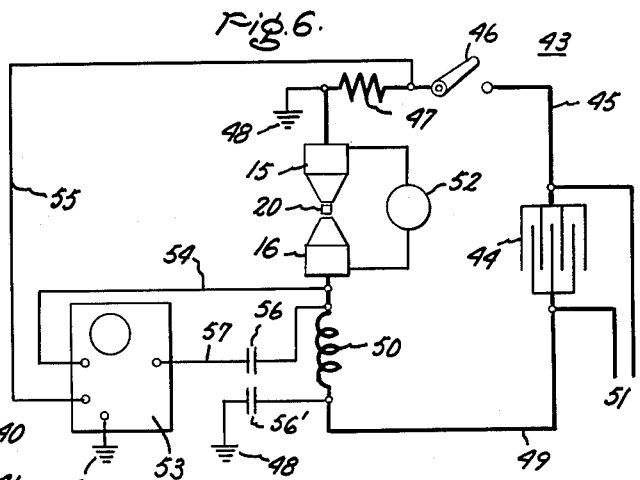
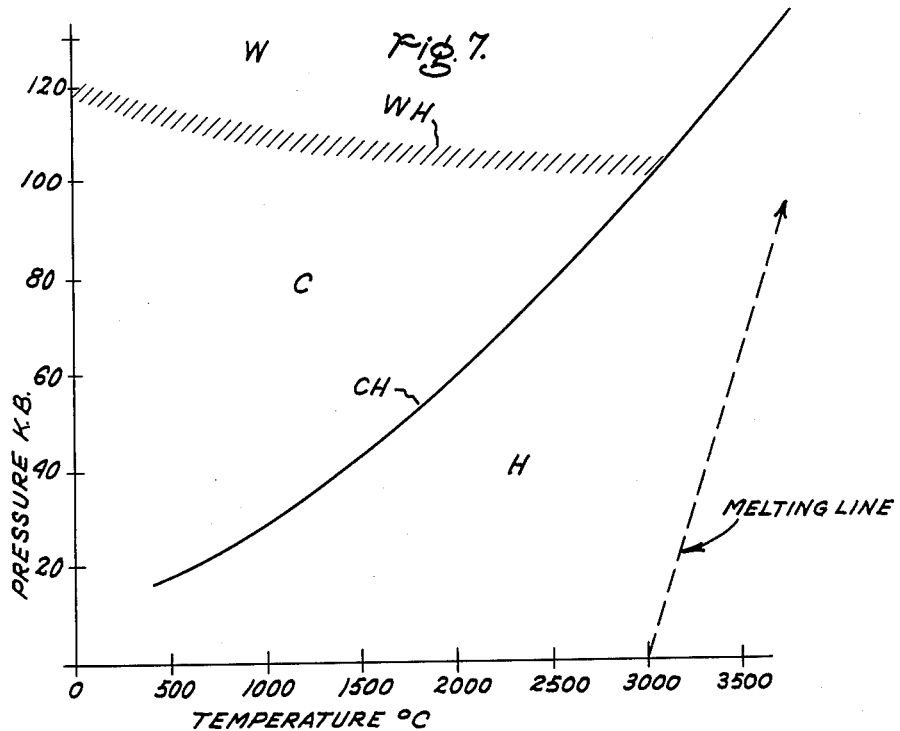

3,212,851
BORON NITRIDE HAVING A NEW STRUCTURE
Francis P. Bundy, Scotia, and Robert Henry Wentorf, Jr., Schenectady, N.Y., assignors to General Electric Company, a corporation of New York
Filed May 2, 1962, Ser. No. 191,782
2 Claims. (Cl. 23—191)

This invention relates to a new crystal structure of boron nitride, and more particularly to a close packed hexagonal boron nitride crystal having a wurtzite structure.

A large variety of abrasive materials are employed for industrial purposes. These materials are utilized generally as abrasives, cutting elements, grinding mediums and compounds, and for other related and unrelated purposes. Many of the materials utilized as abrasive elements also find utility as optical devices, gems, and other such applications. In this group are more notably, diamond, sapphire, and other such materials having high hardness values as measured or indicated by the Mohs scale of from 1–10, 10 being diamond. In addition to these materials, it has been discovered that the cubic form of boron nitride is also a good abrasive medium, and a further crystal to be classified with the above-mentioned abrasives. A more complete description of a cubic form of boron nitride crystal and the method of producing such crystal is given in U.S. Patent 2,947,617—Wentorf.

There is and has for some time existed a generally recognized need for more and different abrasive materials, new sources of such abrasive materials and improved production methods. Further investigation of methods of producing the cubic form of boron nitride provided an unexpected discovery of a close packed hexagonal structure (wurtzite structure) of boron nitride having a high value of hardness and advantageous abrasive characteristics.

It is thus an object of this invention to provide an improved crystal structure.

It is another object of this invention to provide an improved abrasive medium.

Another object of this invention is to provide a close packed hexagonal crystal structure of boron nitride.

It is another object of this invention to provide an improved process of providing the wurtzite structure of boron nitride.

These and other objects of this invention are accomplished by converting hexagonal boron nitride to a hard crystal wurtzite structure by subjecting the hexagonal form of boron nitride to high pressures sufficient to effect the conversion from ordinary hexagonal boron nitride (characterized by being a white, soft, slippery powder) to a hard close packed hexagonal form of wurtzite structure.

This invention will be better understood when taken in connection with the following description and the drawings in which:

FIG. 1 is an illustration of a modified "belt" apparatus utilized to practice this invention;

FIG. 2 is a reaction vessel for the apparatus of FIG. 1;

FIG. 3 is a top sectional view of the reaction vessel of FIG. 1 showing the parts thereof in their operative relationship;

FIG. 4 is an illustration of a further reaction vessel for the apparatus of FIG. 1;

FIG. 5 is a simplified reaction vessel employed where heating is not desired;

FIG. 6 is a schematic illustration of a capacitor discharge circuit; and

FIG. 7 is an illustration of a phase diagram of boron nitride.

An apparatus utilized to subject boron nitride to high pressures is a modification of the high pressure high temperature apparatus disclosed and described in U.S. Patent 2,941,248—Hall. The modification is illustrated in proper proportion in FIG. 1.

Referring now to FIG. 1, apparatus 10 includes an annular die member 11 having a convergent divergent aperture therethrough and surrounded by a plurality of hard steel binding rings (not shown) for support purposes. One satisfactory material for die member 11 is Carboloy cemented carbide grade 55A. Modification of the die member 11 in this invention includes tapered surfaces 13 havnig an angle of about 52.2° with the horizontal, and a generally right circular cylindrical chamber 14 of 0.200 inch diameter.

A pair of tapered or frustoconical punches 15 and 16 of about 1.0 inch O.D. at their bases are oppositely positioned with respect to each other and concentric with aperture 12 to define a reaction chamber therewith. These punches also utilize a plurality of hard steel binding rings (not shown) for support purposes. One satisfactory material for punches 15 and 16 is Carboloy cemented carbide grade 883. Modification of the punches includes tapering of flank surfaces 17 of a 60° included angle to provide faces 18 of 0.150 inch diameter, and with tapered portions of the punches being about 0.560 inch in axial dimension. The combination of the 60° included angle and the 52.2° angle of the tapered surface 13 provides a wedge-shaped gasket opening therebetween.

A further modification of this invention relates to sealing means. Sealing or gasketing is provided by means of single gaskets 19 of a high pressure gasket material, for example pyrophyllite. Gaskets 19 between the punches 15 and 16 and die member 11 are wedge-shaped to fit between the defined space and of sufficient thickness to establish a distance of 0.060 inch between punch faces 18.

A reaction vessel 20 is positioned between the punch faces 18. In this instance, reaction vessel 20 as one working example includes a cylindrical or spool-shaped pyrophyllite sample holder 21 having a central aperture 22 therethrough. The parts to be positioned in aperture 22 in their operative relationship are more clearly illustrated in FIG. 2 without the sample holder 21. Reaction vessel 20 includes both the sample material and its heating means, in the form of a solid right circular cylinder comprising three concentrically adjacent disc assemblies 23, 24, and 25. Disc assembly 23 includes a larger (¾) segmental portion 26 of boron nitride and a smaller (¼) segmental portion 27 of graphite for electrical conducting purposes. Disc assembly 25 also includes a larger (¾) segmental portion 28 of boron nitride and a smaller (¼) segmental portion 29 of graphite for electrical conducting purposes. Disc assembly 24 includes a pair of spaced apart segmental portions 30 of boron nitride (not shown) with a bar form of graphite heater 32 therebetween. Graphite heater 32 is about 0.020 inch thick by 0.0250 inch wide by 0.080 inch length. Each disc assembly 23, 24, and 25 is 0.080 inch diameter by 0.020 inch thick. FIG. 3 illustrates the reaction vessel of FIG. 2 in a top cutaway view for more specific clarification of the operative relationship. From either FIG. 2 or FIG. 3 can be seen that an electrical circuit is established from graphite segment electrode 27 through heater 32 to graphite segment electrode 29 for electrical resistance heating of the heater 32 which in turn raises the temperature of the boron nitride parts. Alternately, the graphite heater may be a mixture of graphite and boron nitride powders suitably molded thus providing, if desirable, the use of other materials for the mentioned boron nitride parts.

A modified reaction vessel 33, as an additional working example, is illustrated in FIG. 4. In FIG. 4, a sample holder 21 (not shown) includes a pair of pyrophyllite disc members 34 and 34' of about 0.080 inch diameter and about 0.017 inch thickness positioned concentrically one on each side of disc assembly 35. Disc assembly 35 includes a pair of segments 36 and 36' in spaced apart relationship to receive a metal tube 37 therebetween. Segments 36 and 36' are about 0.080 inch diameter and about 0.025 inch thickness, while tube 37 is, as one working example, titanium of 0.030 inch O.D., 0.025 inch I.D., and 0.080 inch length. Tube 37 contains the sample material to be utilized, for example hexagonal boron nitride of graphitic structure, and is slightly flattened to be about 0.026 inch thick.

In order to provide for the conduction of electrical current into the reaction vessel, electrodes are provided in the form of, for example stainless steel wires 38 and 38' of about 0.020 inch diameter. These wires are positioned at each end of tube 37, one of which, 38, leads upwardly to contact punch 15 and the other, 38', which leads downwardly from the other end of tube 37 to contact punch 16. The positioning of wires or electrodes 38 and 38' is accomplished by drilling a hole of about the same diameter as that of electrodes 38 and 38', closely adjacent to periphery of discs 34 and 34' and inserting the electrodes therein.

FIG. 5 is an illustration of a reaction vessel which is employed where additional heating is not required. In FIG. 5, reaction vessel 39 includes a pair of discs 40 and 40' of about 0.10 inch thickness and which may be of a material, as pyrophyllite, and an intermediate cylinder 41 of the sample material, for example boron nitride. Pyrophyllite is utilized for discs 40 and 40' in order that the high pressure on the sample between the punches may be maintained with the limited punch stroke available despite the increases in density resulting from the conversion of the boron nitride.

Electrical resistance heating for the reaction vessels of FIGS. 2 and 4 is obtained by connecting punches 15 and 16 to a source of power (not shown) by means of conductors 42 and 42' as illustrated in FIG. 1. Current flow is from one punch, for example 15, through the reaction vessel as described, and to punch 16. In FIG. 2, the current path in the reaction vessel is from one graphite segment 27 through the graphite bar 32 as a resistance element and then through segment 29. In FIG. 4, the current path in the reaction vessel is from one wire electrode 38 through tube 37 as a resistance heater, then through wire electrode 38'. Various other reaction vessels, modifications, and configurations as known in the art may also be employed in the practice of this invention.

Apparatus 10 as described provides a desired pressure in a region where the hexagonal form of boron nitride will convert to the close packed hexagonal (wurtzite structure). Operation of apparatus 10 includes placing the apparatus, as illustrated, between the platens of a suitable press and causing punches 15 and 16 to move towards each other thus compressing the reaction vessel and subjecting the sample material therein to high pressure. To calibrate the apparatus for high pressures, the calibration technique as given in aforementioned U.S. Patents 2,941,248 and 2,947,610 may be employed. This technique includes the subjecting of certain metals to known pressures where an electrical phase transition of these materials is indicated. For example, during the compression of iron a definite reversible electrical resistance change is noted at about 130 kilobars. Therefore, an electrical resistance change in iron denotes 130 kilobars pressure.

The following table is indicative of the metals employed in the calibration of the belt apparatus as described:

*Table 1*

| Metal: | Transition Pressure (kilobars) |
|---|---|
| Bismuth I [1] | 25 |
| Thallium | 37 |
| Cesium | 42 |
| Barium I [1] | 59 |
| Bismuth III [1] | 89 |
| Iron | 130 |
| Barium II | 141 |
| Lead | 161 |
| Rubidium | 193 |

[1] Since some metals exhibit several transitions with increasing pressure, the Roman numerals indicate the transition utilized, in sequential order.

A more particular description of methods employed to determine the above transition values may be found in the publication of F. P. Bundy, Calibration Techniques in Ultra High Pressures, Journal of Engineering for Industry, May, 1961; Transactions of the ASME, Series B, and P. W. Bridgman, Proceedings of the American Academy of Arts and Science, Vol. 74, Page 425, 1942, Vol. 76, Page 1, 1945, and Vol. 76, Page 55, 1948. The Bridgman values were later corrected to their present values as given in the above table. See R. A. Fitch, T. E. Slykhouse, H. G. Drickamer, Journal of Optical Society of America, Vol. 47, No. 11, Pages 1015–1017, Nov. 1957, and A. S. Balchan and H. G. Drickamer, Review of Scientific Instruments, Vol. 32, No. 3, Pages 308–313, March, 1961. By utilizing the electrical resistance changes of the metals as given, a press is suitably calibrated to provide correct readings for the approximate pressure within the reaction vessel.

Temperature is raised in the reaction vessels as described by various means such as for example, ordinary slow resistance type heating as is well known, or by capacitor circuit discharge, or by a thermite reaction, etc. The more common methods of raising the temperature are, slow resistance heating, one example being similar to the circuitry and method described in U.S. Patent 2,947,610 where an electric current at a few volts heats a resistance element over a period of minutes for example, and capacitor discharge heating which is employed for rapid heating. A capacitor circuit 43 employed for discharging current through sample 32 or 38 is best described with respect to FIG. 6. Generally speaking, the circuit is a capacitor discharging circuit which discharges current through apparatus 10, as has been described, with oscilloscope and resistance readings being taken for voltage, current, and resistance of the sample. In FIG. 6, circuit 43 includes a bank of electrolytic capacitors having a capacity of about 85,000 microfarads and illustrated as capacitor 44. Capacitor 44 is capable of being charged up to about 120 volts. Lead 45 connects one side of capacitor 44 to upper punch 15, through switch 46 and a noninductive current resistor 47 of 0.00193 ohm. Resistor 47 includes ground connection 48. The other side of capacitor 44 is connected by means of lead 49 to punch 16 through an inductance choke coil 50 of 25 microhenries and 0.0058 ohm resistance. Capacitor 44 is charged from a suitable source of power 51 (not shown). It can thus be understood that after charging capacitor 44, switch 46 may be closed to discharge current through sample 32 in reaction vessel 20. Thermodynamic calculations with respect to cold graphite surrounded by such materials as pyropyllite, magnesium oxide (MgO), and boron nitride (BN), and based on ordinary values of thermal conductivity and heat capacity, indicate a cool off period to half temperature at the center of a graphite sample in the reaction vessel of FIG. 2 of about 0.015 second. The described electrical circuit provides injection of the required heating energy in about 0.001 to 0.004 second. A Kelvin bridge resistance meter 52 may be connected to top punch 15 and bottom punch 16 to measure the resistance through tube 37 or heater 32 to indicate low temperature conductive characteristics.

For a graphic illustration of voltage and current through heater 24, circuit 43 therefore includes a Tektronix 535A oscilloscope 53 connected by lead 54 as the E, voltage signal to bottom punch 16, and by lead 55 as the E$i$, current signal to lead 45 between switch 46 and resistor 47. Oscilloscope 53 includes a ground connection 48 as illustrated. The ground 48 of circuit 43 is located between sample heater 24 and the current resistor 47 so that the E and E$i$ signals to the oscillographs have a common ground. Oscilloscope 53 provides a recording interval that corresponds to discharge time, with 0–5 and 0–10 milliseconds being employed for the examples of this invention. The oscillogram was photographed by a Land Polaroid camera mounted in front of the screen.

Various arrangements may be utilized to provide a triggering signal for oscilloscope 53. One convenient circuit utilizes a capacitor 56 of 1 microfarad capacity connected by lead 57 from one side of induction choke coil 50 to oscilloscope 53. An additional capacitor 56' of 1 microfarad capacity is connected from the other side of inductance choke coil 50 to ground 48. The sweep triggering signal is thus about that of the voltage drop across inductance choke coil 50. It is understood that many variations of this circuit are also applicable for the intended purpose. For example, more oscilloscopes may be employed or the oscilloscope and its circuitry may be dispensed with when measurements are unecessary.

The temperature in the reaction vessel may be obtained by calculation or calibration. The temperature in the sample may be calculated based upon electrical energy insertion, for example in joules, from capacitor circuit 43, as more particularly described in application Serial No. 191,914—Bundy, filed May 2, 1962 (now abandoned) and the continuation-in-part thereof, application Serial No. 214,793—Bundy, filed July 30, 1962 and copending herewith, both of which applications are assigned to the same assignee as the present invention. Briefly, the calculations relate to the use of the reaction vessel of FIG. 1 with known values of the specific heat of graphite. Thus the energy insertion by the capacitor circuit measured by bolts and farads may be correlated to the energy dissipated in the sample.

Alternately, the temperatures may be predicated on wattage input to the heater tube 37. In this respect, tube 37 may be replaced with a nickel wire for example, and suitable meters connected thereto for resistance readings. A.C. electrical power as in U.S. Patent 2,947,610 is supplied to the reaction vessel to cause melting of the wire, and the corresponding point of increase in electrical resistance is noted. The power utilized ranges from about 1–3 volts and up to about 80 amperes. This operation is repeated at various pressures so that a watt input versus temperature curve is established. An extrapolation of such a curve will provide a temperature condition based upon wattage input.

In one exemplary practice of this invention, reaction vessel 39 was assembled with hexagonal boron nitride for the sample 41 and placed in apparatus 10. The hexagonal boron nitride was a solid molded form of hexagonal boron nitride with an analysis indicating about 97 percent boron nitride and about 2.45 percent $B_2O_3$. Apparatus 10 was then positioned between a pair of platens of a 300 ton capacity press so that the platens moved punches 15 and 16 towards each other to compress the reaction vessel 39 to raise the pressure in the hexagonal boron nitride sample to about 120 kilobars. Pressure rise may be accomplished slowly or rapidly with no change in the final result. Pressure rise may also be incremental or constant. In this exemplary practice, pressure rise was completed in about 3 minutes. After about a 5-minute interval, the pressure was reduced and the reaction vessel 39 was removed from the apparatus 10. The sample cylinder 41 was microscopically examined and found to be polycrystalline containing a great number of small crystals of the wurtzite form of boron nitride. The wurtzite structure verification was conclusively indicated by X-ray analysis. From X-ray analysis and calculations, the density of this material is about 3.43 grams/cm.$^3$, the optical index of refraction for red light is about 2.22 (birefringent), and the hardness is about the same as diamond, i.e., about 10 on the Mohs scale. The lattice constants for the wurtzite structure are $a_0$ of 2.55 A. and $c_0$ of 4.20 A. at 25° C.

Representative examples of the conversion process are given in the following Table 2. In the Table 2, both types of heating means were employed, i.e., low voltage slow resistance type heating, and capacitor circuit discharge type of heating. The measure of heating energy for the slow resistance type of heating as previously described is indicated under the column denoted as "watts." All wall materials for the reaction vessel of FIG. 4 and parts 41 and 41' of FIG. 5 were pyrophyllite. The sample materials were (1) commercially available solid molded form of boron nitride, indicated as MBN, containing about 97.5% boron nitride and about 2.45% $B_2O_3$, and (2) a high purity powder form of boron nitride, indicated as PBN, of 99.8% boron nitride. The powder material was packed into tube 37. X-ray analysis indicated no wurtzite structure present in the starting materials. In the practice of this invention, the reaction vessels are assembled as described and illustrated, and placed in the apparatus of FIG. 1. The reaction vessel is then subjected to the desired high pressure. Where electrical resistance heating is employed, the reaction vessel is connected into the slow resistance heating circuit for a predetermined temperature rise, or alternately, the capacitor circuit 42 is utilized for rapid heating. After a period of about 1 to 5 minutes, temperatures and then pressures are reduced and the sample is recovered. The results illustrate significant conversion, ranging upwardly to 50% and greater (Examples 1 and 4) by volume of the BN starting material.

Table 2

| Example No. | Reaction Vessel | Pressure, Kilobars | Slow Heating Circuit, Watts | Capacitor Circuit | | T., °K. | Heating Time, Min. | Results |
|---|---|---|---|---|---|---|---|---|
| | | | | Volts | Farads | | | |
| 1 | Fig. 4 PBN | 130 | 110 | | | 2,400 | 1 | Wurtzite. |
| 2 | Fig. 4 PBN | 113 | 130 | | | 2,500 | 1 | Do. |
| 3 | Fig. 4 PBN | 113 | 113 | | | 1,900 | 1 | Do. |
| 4 | Fig. 5 MBN | 140 | | | | 300 | 5 | Do. |
| 5 | Fig. 2 MBN | 140 | (¹) | 28 | 0.085 | 2,500 | | Do. |
| 6 | Fig. 2 50/50 mix. PBN + graphite. | 130 | | 75 | 0.0045 | 2,000 | | Do. |
| 7 | Fig. 5 MBN | 130 | | | | 300 | 5 | Do. |
| 8 | Fig. 5 MBN | 140 | | | | 300 | 5 | Do. |
| 9 | Fig. 5 PBN | 125 | | | | 300 | 5 | Do. |

¹ A portion near punch face. A portion adjacent heater.

In Table 3 as follows there is illustrated in tabular form the lattice spacings and relative intensities of an X-ray analysis carried out on the sample material from Example 9 of Table 1. S: strong, W: weak, M: medium, V: very.

Table 3

| Observed | | Hexagonal BN | | Wurtzite BN | |
|---|---|---|---|---|---|
| $I/I_1$ | d A. | d A. | $I/I_1$ | d A. | $I/I_1$ |
| S | 3.32 | 3.33 | 100 | | |
| MS | 2.21 | | | 2.21 | M |
| M | 2.16 | 2.17 | 15 | | |
| MW | 2.11 | | | 2.10 | M |
| W | 2.06 | 2.06 | 6 | | |
| M | 1.96 | | | 1.96 | M |
| W | 1.81 | 1.817 | 13 | | |
| W | 1.66 | 1.667 | 6 | | |
| W | 1.52 | | | 1.52 | MW |
| VVW | 1.32 | 1.322 | 3 | | |
| MW | 1.275 | | | 1.275 | MW |
| MW | 1.25 | 1.253 | 6 | | |
| W | 1.19 | | | 1.185 | MW |
| W | 1.17 | 1.173 | 8 | | |
| VVW | 1.10 | 1.111 | 1 | | |
| W | 1.09 | 1.086 | 1 | 1.09 | W |
| VVW | 1.07 | 1.071 | <1 | | |
| VVW | 1.032 | 1.032 | 1 | | |
| VVW | 1.002 | 1.001 | 5 | | |
| VVW | .977 | .973 | <1 | | |

The practice of this invention indicates conversion of the hexagonal form of boron nitride to the wurtzite structure, at a pressure of about 120 kilobars at room temperature. With increases in temperature, the hexagonal boron nitride begins to convert in part to the cubic form of boron nitride which is the subject of application Serial No. 191,914—Bundy, filed May 2, 1962 (now abandoned) and of the continuation-in-part thereof, application Serial No. 214,793—Bundy, filed July 30, 1962, both of which applications are assigned to the same assignee as the present invention.

From the examples of the above table as well as numerous other examples, it was noted that, within the apparatus calibration range, differences in wall materials of the reaction vessel did not have an appreciable effect on pressures attained. It should be understood that pressures within the reaction vessel are based upon calibration means as described and the accuracy of any pressure determination is not therefor of precise nature. Additionally, the pressure at which conversion starts to take place is also not a precise measurement. Representative examples indicate more complete conversion at elevated pressures. Conversion of hexagonal boron nitride to the wurtzite structure with applied heating is initiated in the range of about 110 kilobars to 115 kilobars or, more specifically, at a pressure of at least about 113 kilobars. By "at least about" is intended to include a reasonable variance both above and below the given number. All examples were examined by X-ray analyses to determine the presence of the wurtzite structure.

The starting materials for the practice of this invention may include a source of boron and nitrogen generally, which will combine under the conditions of the reaction to provide boron nitride. Boron nitride is a preferred starting material because of its known physical and chemical characteristics such as density, crystal structure, etc. X-ray analysis of the various examples in the above table indicated only lines present of known materials in the boron nitride.

While all the above examples are representative of the practice of this invention with one preferred form of apparatus and preferred heating methods, other apparatuses are available and known in the art which will provide the given conditions, more particularly, apparatus capable of providing pressures of at least about 113 kilobars together with a temperature increase. Other circuitry or heating methods may be employed where the circuit as described in the invention may be altered or changed, the more important requirements being that the heating means will provide the desired temperature concurrent with the pressure conditions utilized. Obviously, the apparatus as illustrated in FIG. 1 or the reaction vessels may be suitably changed or scaled up to provide a larger reaction volume.

The pressures and temperatures as utilized in this invention are based upon the calibrations as described. Many variables are present and thus the numerical values are subject to some interpretation of, for example changes in the materials in the reaction vessel and in the apparatus. Thus, the lower limits of the area of operation are not precise. However, practice of the invention as described produces the wurtzite structure of boron nitride.

FIG. 7 is illustrative of the area of operation of this invention. In FIG. 7, the graph is that generally of the phase diagram of boron nitride, the areas H, C, and W indicating the areas of hexagonal boron nitride, cubic boron nitride, and the wurtzite form of boron nitride, respectively. Under the given pressure-temperature-catalyst conditions, line CH is that line of equilibrium between hexagonal and cubic form of boron nitride, i.e., above line CH, boron nitride is stable as the cubic form. The C area is inclusive of the W area. Line M is the melting line of boron nitride. Line WH is the wurtzite equilibrium line, better described and illustrated as a small area, for the wurtzite structure of boron nitride. This line or area defining the lower limits of this invention commences at about 120 kilobars pressure at room temperature and diminishes to about 110 kilobars pressure at temperatures on the order of 2500° C. In the practice of this invention room temperature operation provides near total conversion to the wurtzite structure. With an increase in temperature partial conversion to cubic boron nitride takes place.

The objects of this invention are thus achieved by subjecting hexagonal boron nitride to high pressures for conversion to a close packed hexagonal, i.e., wurtzite structure. More specifically, the subjection of the boron nitride material to pressures above about 120 kilobars causes conversion of the boron nitride starting material to the wurtzite structure. Addition of heating means to provide a temperature rise varies the percent conversion. More specific boundaries, based upon calibrations as noted, are for example, pressures at least about 120 kilobars at room temperature and about 110 kilobars at elevated temperatures.

The wurtzite structure obtained by means of this invention is widely applicable for various industrial purposes in the same manner as cubic form of boron nitride, for example as abrading or cutting elements and other related and unrelated purposes.

While a specific method and apparatus in accordance with this invention is described and shown, it is not intended that the invention be limited to the particular description nor to the particular configurations illustrated, and it is intended by the appended claims to cover all modifications within the spirit and scope of this invention.

What we claim as new and desire to secure by Letters Patent of the United States is:

1. Boron nitride having a wurtzite structure with a density of about 3.43 g./cm.$^3$, an optical index of refraction for red light of about 2.22 (birefringent) and hardness of about 10 on the Mohs scale.

2. Boron nitride having a wurtzite structure substantially as recited in claim 1 with lattice constants of $a_0$ of 2.55 angstroms and $c_0$ of 4.20 angstroms at 25° C.

References Cited by the Examiner

UNITED STATES PATENTS

| 2,801,903 | 8/57 | Fetterly et al. | 23—191 |
| 2,808,314 | 10/57 | Taylor | 23—191 |
| 2,832,672 | 4/58 | Fetterly et al. | 23—191 |
| 2,947,617 | 8/60 | Wentorf | 23—191 X |

FOREIGN PATENTS 860,499  2/61  Great Britain.

MAURICE A. BRINDISI, *Primary Examiner.*